United States Patent
Proffitt et al.

(10) Patent No.: US 8,065,770 B2
(45) Date of Patent: Nov. 29, 2011

(54) DOCK LEVELER WITH CONTINUOUS POSITION SENSING

(75) Inventors: Greg Proffitt, Waukesha, WI (US);
Jason Senfleben, Milwaukee, WI (US);
Mark Van Eimeren, West Bend, WI (US)

(73) Assignee: Rite-Hite Holding Corporation, Milwaukee, WI (US)

( * ) Notice: Subject to any disclaimer, the term of this patent is extended or adjusted under 35 U.S.C. 154(b) by 0 days.

(21) Appl. No.: 12/428,291

(22) Filed: Apr. 22, 2009

(65) Prior Publication Data

US 2010/0269273 A1 Oct. 28, 2010

(51) Int. Cl.
*E01D 1/00* (2006.01)
(52) U.S. Cl. ............ 14/69.5; 14/71.1; 14/71.3; 14/71.5
(58) Field of Classification Search ........... 14/69.5–72.5
See application file for complete search history.

(56) References Cited

U.S. PATENT DOCUMENTS

| | | | |
|---|---|---|---|
| 2,846,703 A | 8/1958 | Adley | |
| 2,972,762 A | 2/1961 | McConica | |
| 2,994,894 A | 8/1961 | Loomis et al. | |
| 3,201,814 A | 8/1965 | Le Clear | |
| 3,255,478 A | 6/1966 | Lambert | |
| 3,290,709 A | 12/1966 | Whitenack, Jr. | |
| 3,388,413 A | 6/1968 | Clarke | |
| 3,579,696 A | 5/1971 | Hecker, Jr. et al. | |
| 3,763,514 A | 10/1973 | Bishop | |
| 3,786,530 A | 1/1974 | Le Clear | |
| 3,920,710 A | 11/1975 | Whitenack, Jr. | |
| 3,967,337 A | 7/1976 | Artzberger | |
| 4,365,374 A | 12/1982 | Bennett | |
| 4,488,325 A | 12/1984 | Bennett et al. | |
| 4,727,613 A | 3/1988 | Alten | |
| 4,827,549 A | 5/1989 | Walker | |
| 4,944,062 A | 7/1990 | Walker | |
| 4,977,635 A | 12/1990 | Alexander | |
| 4,979,253 A | 12/1990 | Alexander | |
| 5,040,258 A | 8/1991 | Hahn et al. | |
| 5,088,143 A | 2/1992 | Alexander | |
| 5,205,010 A | 4/1993 | Hageman | |
| 5,416,941 A | 5/1995 | Hageman | |
| 5,440,772 A * | 8/1995 | Springer et al. | 14/69.5 |
| 5,457,838 A * | 10/1995 | Gelder et al. | 14/69.5 |
| 5,511,267 A | 4/1996 | Alexander | |
| 5,526,545 A * | 6/1996 | Alexander | 14/71.3 |
| 5,553,343 A | 9/1996 | Alexander | |
| 5,586,355 A * | 12/1996 | Metz et al. | 14/69.5 |

(Continued)

FOREIGN PATENT DOCUMENTS

CA 1146309 5/1983

(Continued)

*Primary Examiner* — Raymond W Addie
(74) *Attorney, Agent, or Firm* — Hanley, Flight & Zimmerman, LLC

(57) ABSTRACT

An example dock leveler for a loading dock includes a position sensor system that not only senses upper and lower travel limits of the dock leveler's deck and/or lip but can also sense a plurality of intermediate positions between the limits. In some examples, the system includes one or more cable-extension transducers that provide a feedback signal that varies as a function of the deck's position relative to a dock platform and/or varies as a function of the lip's position relative to the deck. Such a position sensor system makes it possible to operate the dock leveler automatically with little to no manual intervention.

21 Claims, 4 Drawing Sheets

U.S. PATENT DOCUMENTS

| | | | |
|---|---|---|---|
| 5,586,356 A | | 12/1996 | Alexander |
| 5,774,920 A | | 7/1998 | Alexander |
| 5,784,740 A | | 7/1998 | DiSieno et al. |
| 5,826,291 A | * | 10/1998 | Alexander ............... 14/71.3 |
| 5,831,540 A | * | 11/1998 | Sullivan et al. ............ 340/679 |
| 6,065,172 A | | 5/2000 | Swessel |
| 6,112,353 A | | 9/2000 | Winter |
| 6,276,016 B1 | * | 8/2001 | Springer ............... 14/71.1 |
| 6,499,169 B2 | | 12/2002 | Jehn et al. |
| 7,134,159 B2 | * | 11/2006 | Muhl et al. ............... 14/71.3 |
| 2006/0042030 A1 | * | 3/2006 | Yoon et al. ............... 14/71.1 |

FOREIGN PATENT DOCUMENTS

| | | |
|---|---|---|
| DE | 3049611 | 7/1982 |
| DE | 4242415 | 2/1994 |
| EP | 0302356 | 2/1989 |

* cited by examiner

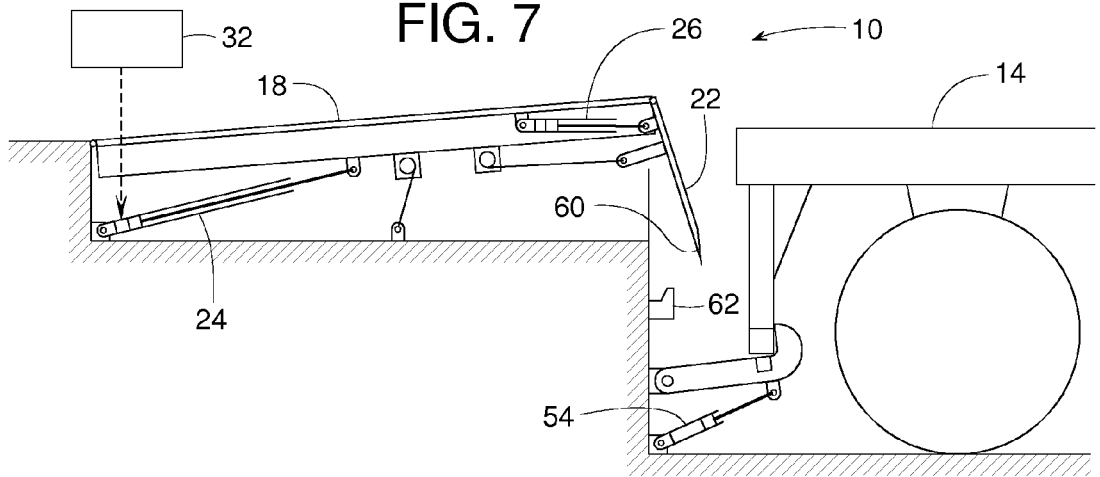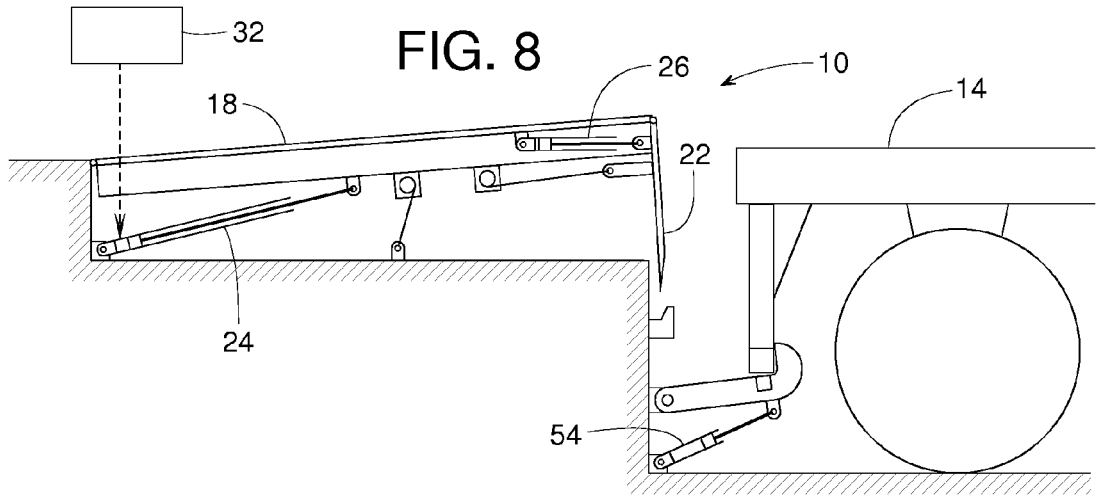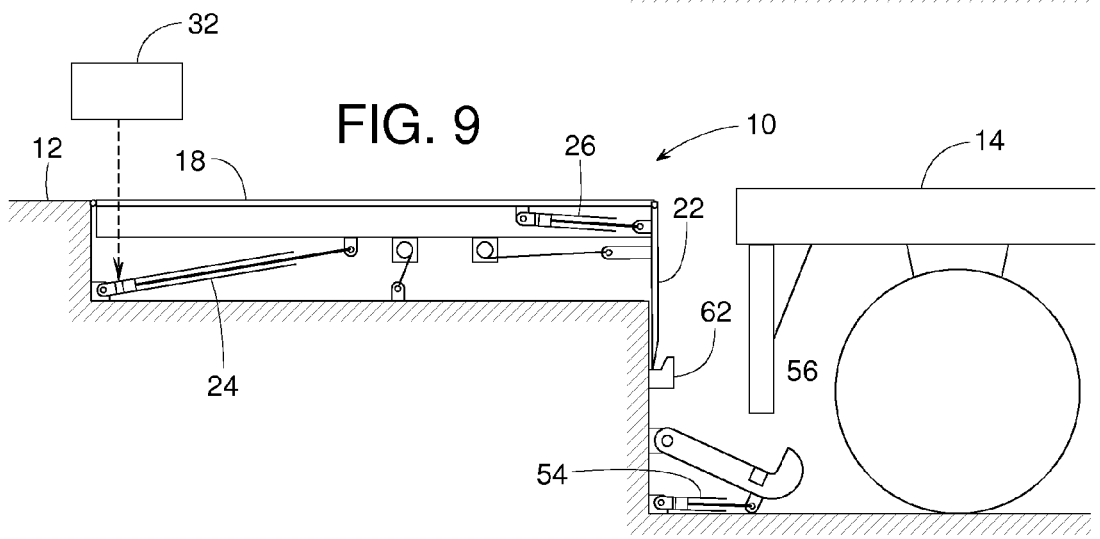

8,065,770 B2

DOCK LEVELER WITH CONTINUOUS POSITION SENSING

FIELD OF THE DISCLOSURE

The subject disclosure generally pertains to dock levelers and, more specifically, to position sensing systems for dock levelers.

BACKGROUND

A typical loading dock of a building includes an exterior doorway with an elevated platform for loading and unloading cargo from vehicles, such as trucks and trailers. Loading docks often include a dock leveler to compensate for a height difference that may exist between a loading dock platform and an adjacent bed of the vehicle. Dock levelers typically include a deck with a front edge that can be raised or lowered to the approximate height of the truck bed. An extension plate or lip may extend outward from the deck's front edge to span the gap between the rear of the truck bed and the front edge of the deck, thereby providing a path that allows personnel and material handling equipment to readily move on and off the truck bed during loading and unloading operations.

In some known examples, the dock leveler includes a deck and/or lip that could pivot or translate as the dock leveler moves to its various positions. Such positions might include a cross-traffic position where the deck is substantially flush with the platform, an operative position where the deck and lip provide a bridge between the platform and the vehicle bed, an end-loading position where the lip is off the vehicle bed while the deck is either above, level with or below the bed, or various other positions. Moreover, certain dock leveler operations require the deck or lip to be in specific positions or ranges of positions. While a human operator can observe whether the leveler components are in such positions, it may also be desirable to automate leveler operations without the need for a human operator. Even in the absence of such automation, accurate determination of the position of leveler components throughout their range of motion could be used for other beneficial purposes such as, for example, providing signaling of leveler status or the presence or absence of safe loading conditions.

BRIEF DESCRIPTION OF THE DRAWINGS

FIG. 7 is a side view of the example dock leveler of FIG. 6 but showing the dock leveler's deck at an intermediate deck position and the lip at an intermediate lip position.

FIG. 8 is a side view of the example dock leveler of FIG. 7 but showing the lip fully retracted.

FIG. 9 is a side view of the example dock leveler of FIG. 1.

DETAILED DESCRIPTION

Figure 1:
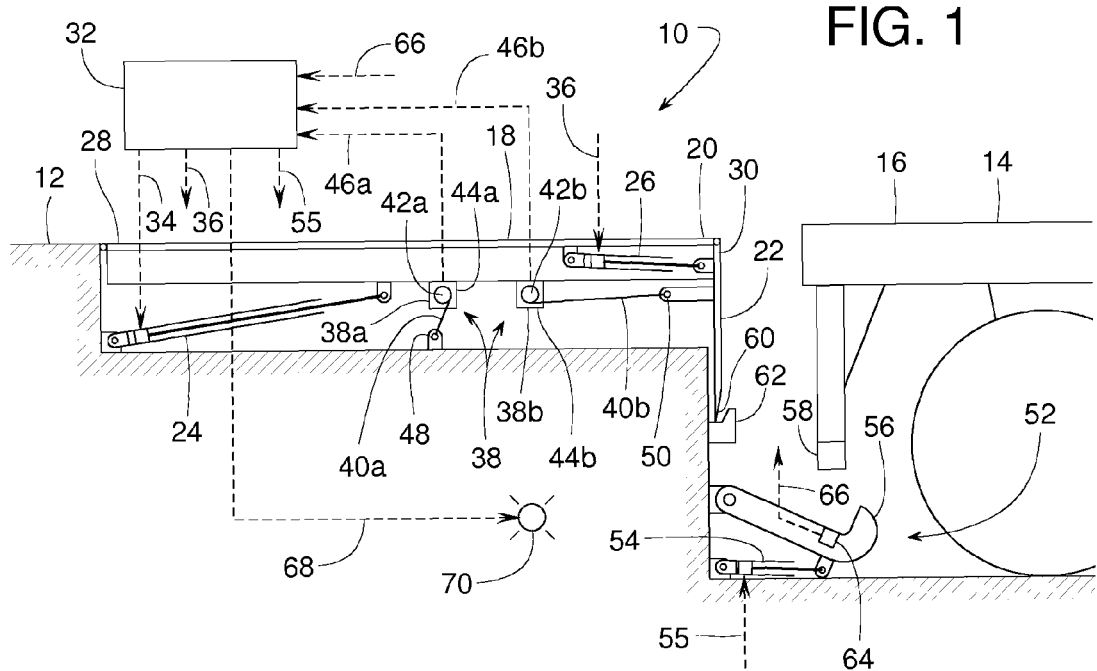
FIG. 1 is a side view of an example dock leveler described herein shown in a stored, cross-traffic position.

FIGS. 1-9 show various operating positions of an example dock leveler 10 installed at a dock platform 12. Dock leveler 10 facilitates the loading and unloading of cargo from a vehicle 14 (e.g., truck, trailer, etc.) by providing a bridge across which a forklift and other material handling equipment can travel between dock platform 12 and a bed 16 of vehicle 14.

To compensate for a height difference that may exist between platform 12 and bed 16, dock leveler 10 includes a deck 18 with a front edge 20 that can be raised or lowered to the approximate height of bed 16. To span a gap between the rear of bed 16 and the deck's front edge 20, a lip 22 extends outward from the deck's front edge 20 so that lip 22 can rest upon vehicle bed 16. Lip 22 can also retract when not in use.

In the illustrated example, deck 18 and lip 22 are shown as pivotal members driven by actuators 24 and 26, respectively. Deck 18 pivots about (e.g., is pivotally mounted to) a back edge 28 to raise or lower front edge 20 relative to platform 12. Deck 18 pivots between an uppermost deck position (FIG. 2) a lowermost deck position (FIG. 6), and a range of intermediate deck positions therebetween including the various intermediate deck positions shown in FIGS. 1, 4, 5, 7, 8 and 9.

In this example, a rear edge 30 of lip 22 is pivotally coupled to the deck's front edge 20 so that lip 22 pivots about edge 30. Lip 22 pivots between an extended lip position (FIGS. 3 and 4) a retracted lip position (FIGS. 1, 2, 8 and 9) and a range of intermediate lip positions therebetween including the various intermediate lip positions shown in FIGS. 5, 6 and 7. In other examples, the vertical movement of deck 18 and the extend/retract movement of lip 22 may be configured to be by way of translating motion.

Actuators 24 and 26 are schematically illustrated to broadly represent any device capable of moving a deck or lip. Examples of actuators 24 and 26 include, but are not limited to, a single-acting hydraulic cylinder, a double-acting hydraulic cylinder, a pneumatic cylinder, a rodless cylinder, a linear motor, an inflatable bladder, a spring, a mechanical linkage, a hoist mechanism, and various combinations thereof.

To facilitate automated leveler operation, and/or to provide other operational benefits based on being able to accurately or approximately determine the position of deck 18 and/or lip 22, sensors for determining the position of these components are provided in a position sensor system 38. Position sensor system 38 is configured to detect the upper and lower travel limits of deck 18 and/or lip 22, or any intermediate positions between the upper and lower travel limits. Being able to sense and identify the upper and lower travel limits and any intermediate positions enables automation of the dock leveler's operation, thereby minimizing or eliminating the need for manual intervention. Alternatively or additionally, such position determination can be used for other beneficial purposes such as, for example, signaling leveler status.

In the illustrated example, position sensor system 38 comprises a first position sensor 38a and a second position sensor 38b for sensing the position of deck 18 and lip 22, respectively. Position sensors 38a and 38b may be any suitable sensing device that can detect the position of a deck (e.g., the deck 18) and/or lip (e.g., the lip 22) at points along and/or throughout its range of motion (e.g., between an upper and lower travel limit). Additionally or alternatively, the position sensors can be configured to continuously detect the positions of deck 18 or lip 22. For example, a position sensor capable of continuously detecting deck or lip position is capable of generating a position-indicative output for every deck and/or lip position between an upper and lower travel limit of the deck and/or lip, as opposed to only indicating discrete deck or lip positions such as, for example, the end-point of the upper or lower travel limit. Examples of sensors 38a and 38b include, but are not limited to, a linear position transducer, a rotary transducer, an encoder, a linear potentiometer, a string potentiometer, a photoelectric/slot device, a photoelectric/reflector device, a ferromagnetic Hall effect device, an ultrasonic transducer, and/or various combinations thereof. In this example, each sensor 38a and 38b is a cable-extension transducer provided by Celesco Transducer Products, Inc., of Chatsworth, Calif. Cable-extension transducers are also referred to as a string pot, draw wire sensor, string encoder or a yo-yo pot and are sensors capable of continuously detecting deck and/or lip positions as mentioned above.

As a cable-extension transducer, sensor 38a comprises a cable 40a or some other retractable/extendable elongate member such as a string, a wire, a ribbon, a strap, a chain, etc., wherein cable 40a is wrapped about a spool 42a. Spool 42a is disposed within a housing 44a and is spring-loaded such that spool 42a tends to draw cable 40a onto itself into housing 44a. Pulling cable 40a out from within housing 44a rotates spool 42a, which in turn rotates a rotational sensor (e.g., encoder, potentiometer, resolver, rotary transducer, etc.). The rotational sensor connected to spool 42a provides an output signal 46a that conveys the cable's length of extension from housing 44a corresponding to the position (e.g., the vertical position) of deck 18 relative to, for example, the platform 12.

By connecting the end of cable 40a to a point 48 fixed relative to platform 12 and mounting housing 44a to deck 18 (or, alternatively, connecting cable 40a to deck 18, and housing 44a to point 48), output signal 46a provides or conveys a substantially continuous signal that varies as a function of the deck's position, thus sensor 38a provides an indication of the deck's position and can distinguish among a plurality of intermediate deck positions. Output signal 46a is inputted to controller 32, which receives signal 46a and uses output signal 46a to determine the position of deck 18. The controller 32 may be programmed with a geometric or functional relationship to convert the value of signal 46a to an actual position value of deck 18. In this example, controller 32 is a general term that may encompass one or more components. For example, if the position sensor system 38 is to be used to facilitate automated leveler operation, controller 32 may form a part of that system 38 and may include a computer, a programmable logic controller, switches, relays and/or different combinations thereof for accepting outputs from the position sensor system 38 and controlling leveler operation such as, for example, by using logic to control the deck and lip actuators 24 and 26 based on the position of deck 18 and lip 22 (e.g., based on the signals provided by sensor 46a). In FIG. 1, an output signal 34 provided by the controller 32 is shown controlling deck actuator 24. Additionally or alternatively, if the position sensor system 38 is to be used for facilitating signaling of, for example, leveler operational status, controller 32 may form a part of system 38 and include logic (e.g., a computer, PLC, switches and relays or combinations thereof or of like components) for controlling such signaling based on deck and lip positions. In FIG. 1, an output signal 68 provided by the controller 32 is shown controlling a light 70. Controller 32 may be included or incorporated within a conventional leveler control box, and thus include, for example, push buttons or interface devices to allow human control of leveler operation.

In a similar manner to sensor 38a sensing deck position, sensor 38b senses the position of lip 22, wherein sensor 38b is associated with a cable 40b, a spool 42b, a housing 44b and a second output signal 46b that perform similar functions corresponding to components 40a, 42a, 44a and 46a, respectively of sensor 38a. By connecting the end of cable 40b to a point 50 fixed relative to lip 22 and mounting housing 44b to deck 18 (or, alternatively, connecting cable 40b to deck 18, and housing 44b to lip 22), second output signal 46b provides a continuous signal that varies as a function of the position of the lip 22. Thus because sensor 38b is coupled to the deck 18, sensor 38b provides an output signal corresponding to or indicating the position of the lip 22 relative to deck 18 and can distinguish among a plurality of intermediate lip positions. Output signal 46b is input or conveyed to controller 32, which uses or processes signal 46b to determine output signals 36 and/or 34. In some examples, a geometric or functional relationship is employed by controller 32 to convert the value of signal 46b to an actual lip position value. While the sensors 38a and 38b have been depicted as cable-extension transducers, they are not so limited, as already indicated above. A further example of a sensor that could be used is a sensor (e.g., a linear transducer) for sensing the amount of extension or retraction of the rods of actuators 24 and 26, and outputting signals indicative thereof, which could be interpreted (for example, by controller 32) as deck and lip positions, respectively. Such sensors that can sense deck and/or lip positions throughout their range of motion have additional benefits beyond deck and lip positions indication. For example, the direction of deck movement (e.g. upward or downward rotation) can be determined. If controller 32 were to sample the output from sensor 38a periodically, and compare (e.g., via a comparator of the controller 32) the results from sequential samples, deck movement direction could be determined. If the time and distance between such samples was determined by controller 32, the speed of that movement could also be determined. Comparison of sequential speed determinations could in turn be used to determine acceleration or deceleration. Accurate position determination, coupled with some computational ability, can thus provide a fairly complete picture of the position and movement status of the leveler components (e.g., the deck 18, the lip 22, etc.).

While the sensors 38a and 38b have been depicted as cable-extension transducers, they are not so limited, as already indicated above. A further example of a sensor that could be used is a sensor (e.g., a linear transducer) for sensing the amount of extension or retraction of the rods of actuators 24 and 26, and outputting signals indicative thereof, which could be interpreted (for example, by controller 32) as deck and lip positions, respectively. Such sensors that can sense deck and/or lip positions throughout their range of motion have additional benefits beyond deck and lip positions indication. For example, the direction of deck movement (e.g. upward or downward rotation) can be determined. If controller 32 were to sample the output from sensor 38a periodically, and compare (e.g., via a comparator of the controller 32) the results from sequential samples, deck movement direction could be determined. If the time and distance between such samples was determined by controller 32, the speed of that movement could also be determined. Comparison of sequential speed determinations could in turn be used to determine acceleration or deceleration. Accurate position determination, coupled with some computational ability, can thus provide a fairly complete picture of the position and movement status of the leveler components (e.g., the deck 18, the lip 22, etc.).

The operation of dock leveler 10 could follow the sequence of FIGS. 1-9, and almost automatically with little or no manual intervention. In this example operational sequence, dock leveler 10 works in conjunction with a vehicle restraint 52 that helps restrain vehicle 14 during the loading or unloading of the vehicle's cargo. To restrain vehicle 14 at the loading dock, an actuator 54 moves a hook 56 between a stored position (FIG. 1) and a restraining position (FIG. 2) to capture or release a rear impact guard 58 of vehicle 14.

In FIG. 1, dock leveler 10 is shown in a stored, cross-traffic position with vehicle 14 having backed into the loading dock in proximity with dock platform 12. Vehicle restraint 52 is in its stored position, deck 18 is generally flush with dock platform 12, and lip 22 is retracted with the lip's tip 60 resting upon a lip keeper 62 to help support the weight of deck 18. In some examples, when the dock leveler 10 is in a cross-traffic position, the lip's rear edge protrudes above the deck 18 to provide the deck 18 with a run-off barrier.

Figure 2:
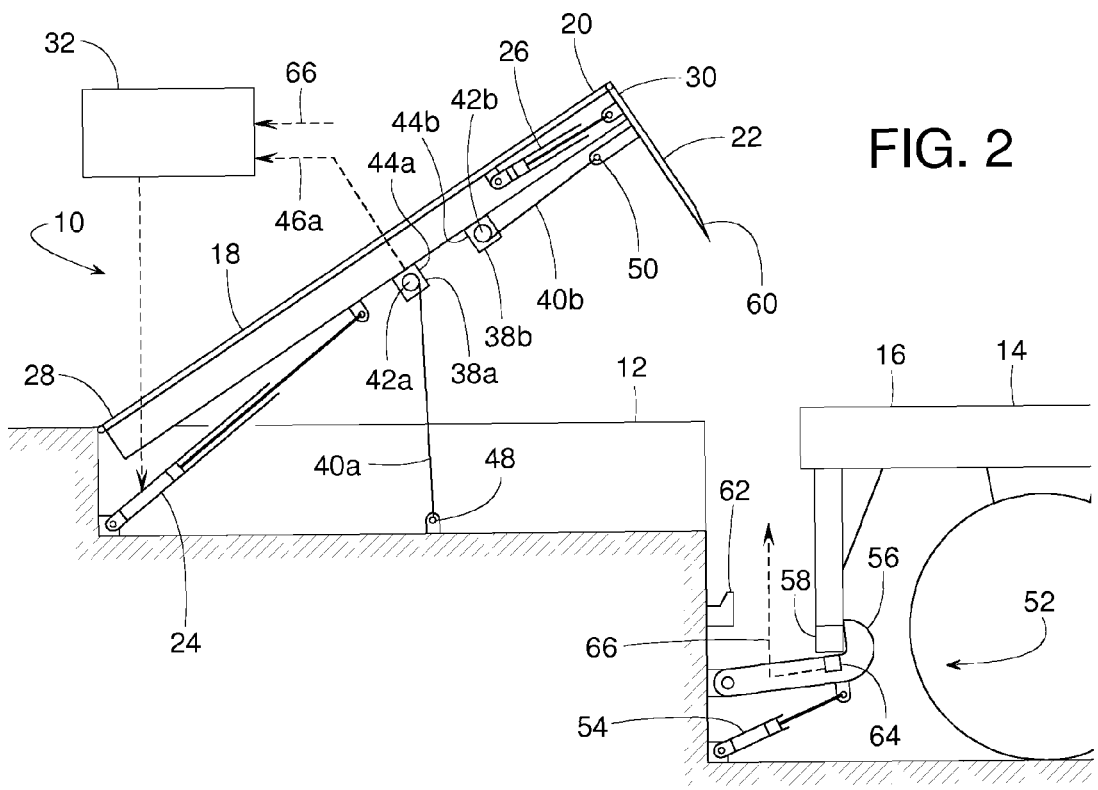
FIG. 2 is a side view of the example dock leveler of FIG. 1 but shown in a raised position.

Next, as shown in FIG. 2, controller 32 commands actuator 54 via an output signal 55 to lift hook 56 to its retraining position to engage the rear impact guard 58 to restrain vehicle 14. A sensor 64 associated with vehicle restraint 52 provides a feedback signal 66 to controller 32 to indicate whether vehicle 14 is restrained. Sensor 64 can be any sensor such as, but are not limited to, an electromechanical limit switch, a proximity switch, a pressure switch, a photoelectric eye, a Hall effect sensor, etc. In addition to activating vehicle restraint 52, controller 32 commands actuator 24 to raise deck 18 to its uppermost deck position or some other raised position such as, for example, a position wherein rotation of the lip 22 to an extended position can occur without interference (e.g., without the lip 22 hitting trailer 14). As deck 18 rises, it pulls cable 40a away or out from within housing 44a, causing sensor 38a to provide output signal 46a to the controller 32 (which could also be considered a feedback signal from sensor 38a to indicate the deck's position). Controller 32 receives signal 46a and uses the signal to determine at which position to stop deck 18. In some examples, depending on the design and control of actuator 24, controller 32 can also use feedback signal 46a to smoothly or gradually decelerate deck 18 just prior to reaching the target raised or lowered positions or some other intermediate deck position.

Figure 3:
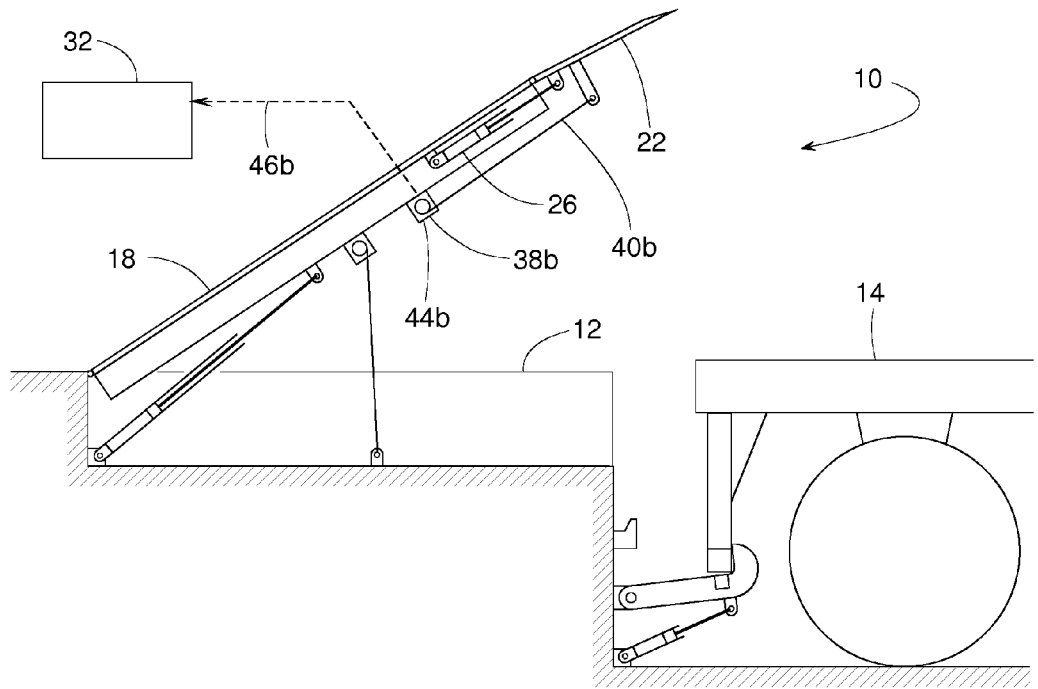
FIG. 3 is a side view of the example dock leveler of FIG. 2 but showing a lip portion of the dock in an extended position.

FIG. 3 shows that once deck 18 is raised to its uppermost deck position or some other target raised position, controller 32 commands actuator 26 to extend lip 22 without interfering with vehicle 14. As lip 22 extends, it pulls cable 40b out from within housing 44b, whereby output or feedback signal 46b from sensor 38b provides a signal corresponding to the lip's position. Controller 32 receives the signal 46b and uses the signal 46b to determine the position at which to stop lip 22. In some examples, depending on the design and control of the actuator 26, the controller 32 can also use feedback signal 46b to smoothly or gradually decelerate lip 22 just prior to reaching the extended or retracted positions or some other intermediate lip position. If desired, dock leveler 10 could be controlled such that deck 18 begins to descend from its position of FIG. 3 while lip 22 is extending.

Figure 4:
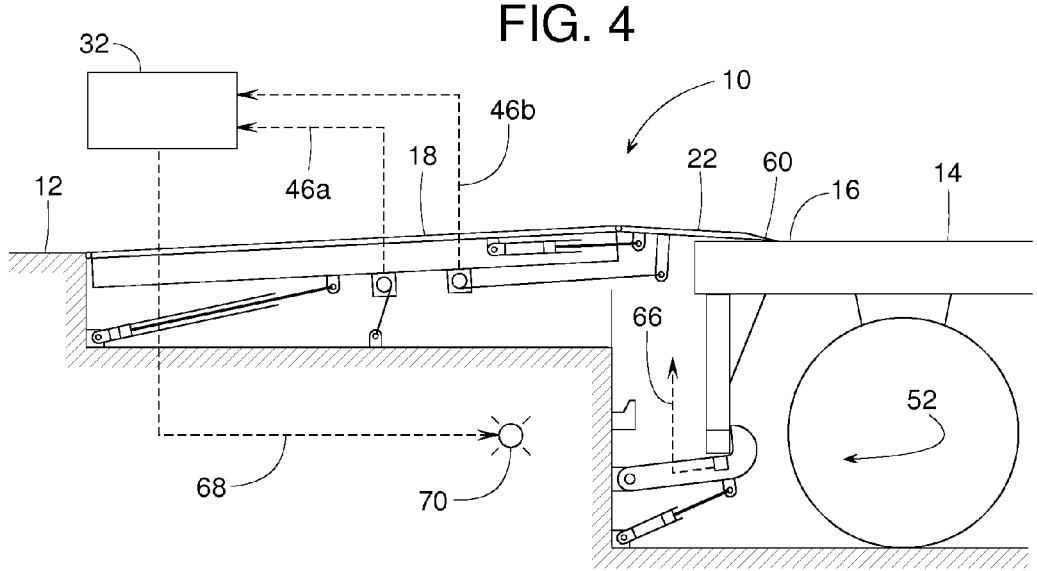
FIG. 4 is a side view of the example dock leveler of FIG. 1 shown in an operative position.

FIG. 4 shows dock leveler 10 in its operative position with deck 18 at an intermediate deck position (e.g., a first intermediate deck position) and lip 22 fully extended and lip 22 resting upon vehicle bed 16. Controller 32 can determine that the dock leveler 10 is in this position from the signals provided by the sensors 38a and 38b. For example, controller 32 can determine that the lip 22 is in an extended position and not moving, and the deck 18 is stationary in a position at or near dock height. These exemplary conditions being met coupled with confirmed engagement of vehicles restraint 56 with the trailer—can be an indication that the trailer is ready to be safely loaded or unloaded. In this position, a forklift or other material handling equipment can travel over dock leveler 10 between platform 12 and bed 16. In response to feedback from signals 46a, 46b and 66, controller 32 may be configured or programmed to provide an output signal 68 that activates a light 70. Light 70 indicates to the vehicle's driver or others in the area that dock leveler 10 and vehicle restraint 52 are properly set or in position to safely load or unload vehicle 14. This function could be performed regardless of whether controller 32 is automating dock leveler 10 operations or function.

Figure 5:
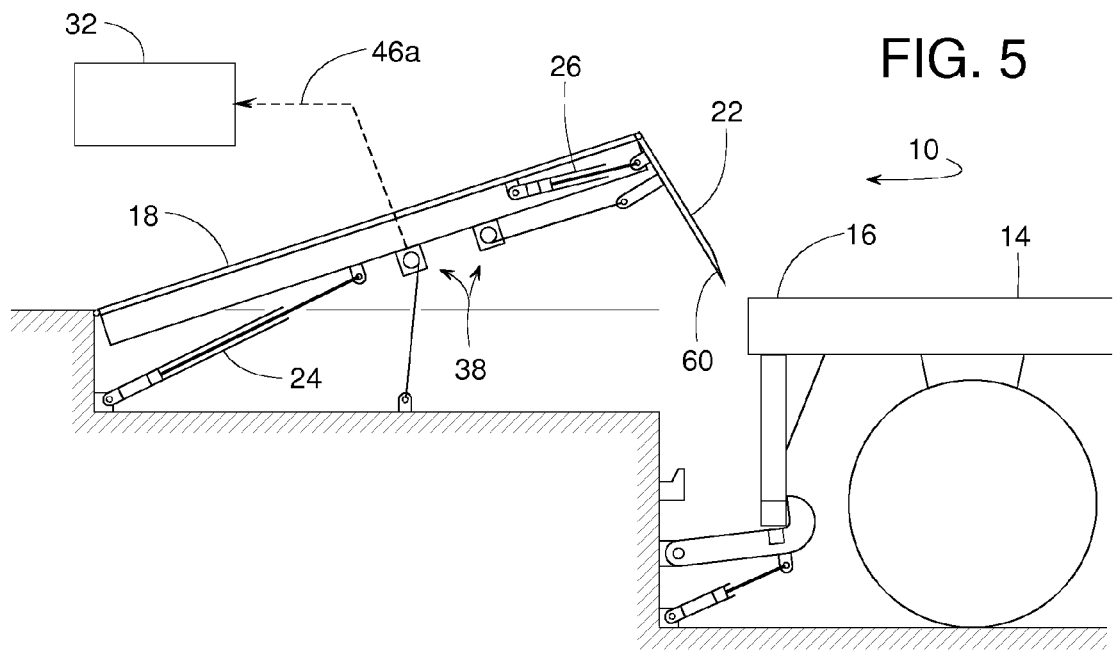
FIG. 5 is a side view of the example dock leveler of FIG. 1 shown in an intermediate-raised position.
Figure 6:
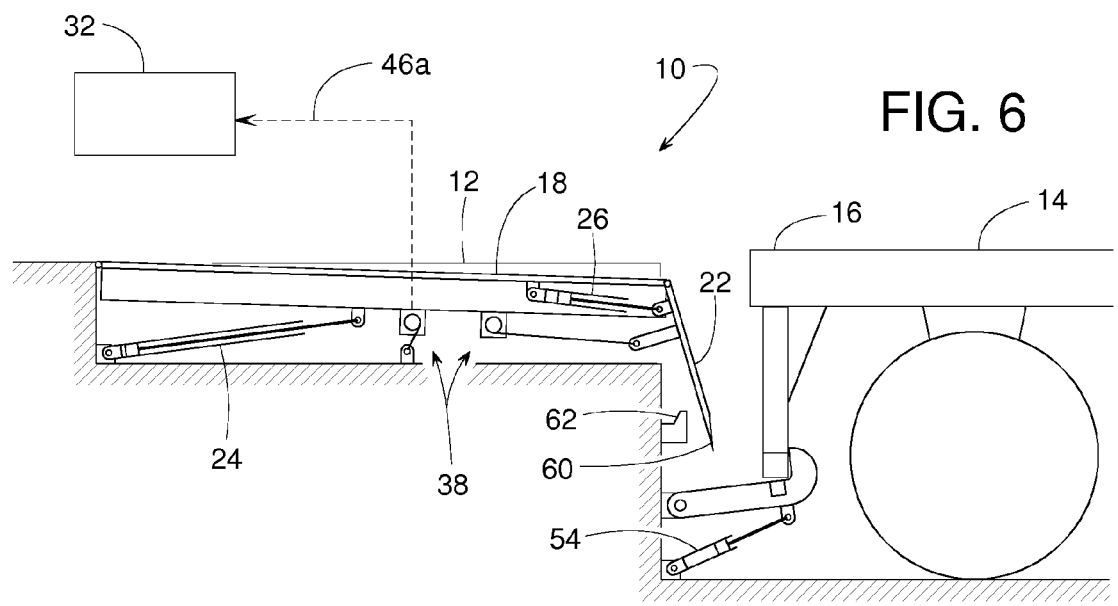
FIG. 6 is a side view of the example dock leveler of FIG. 1 shown at an end-loading position.

Referring to FIGS. 5 and 6, to add or remove cargo from the area of bed 16 where lip 22 rests, controller 32 commands actuators 24 and 26 to move dock leveler 10 from its operative position of FIG. 4 to an end-loading position of FIG. 6. In this manner, controller 32 sends signal 34 to actuator 24 to first raise deck 18 from its first intermediate deck position of FIG. 4 to a second intermediate deck position of FIG. 5, which allows actuator 26 to retract lip 22 from its extended position of FIG. 4 to the intermediate lip position of FIG. 5. The second intermediate deck position of FIG. 5 needs to be at a position (e.g., at a sufficient height relative to the vehicle 14) to prevent vehicle 14 from interfering with the downward movement of lip 22. For example, the second intermediate deck position can be set based on the swing radius of lip 22 and the height of bed 16.

The height of bed 16 can be determined based on the elevation of tip 60 when lip 22 is resting upon bed 16. The tip's elevation is readily determined based on the geometry of dock leveler 10 and the value of feedback signal 46a when dock leveler 10 is in the operative position of FIG. 4. Thus, in this example, the second intermediate deck position of FIG. 5 is determined as a function of the first intermediate deck position of FIG. 4. In other examples, the second intermediate deck position of FIG. 5 can simply be a predetermined value based on the maximum anticipated vehicle height. After dock leveler 10 is in the position of FIG. 5, controller 32 automatically commands actuator 24 to lower deck 18 to its lowermost deck position of FIG. 6 while actuator 26 holds lip 22 at an intermediate position such that the lip 22 is slightly extended away from the deck 18. This allows dock leveler 10 to move to its end-loading position of FIG. 6 with lip 22 at its keeper offset position where the lip's tip 60 is below lip keeper 62.

In this example, as dock leveler 10 moves from the position of FIG. 4 to that of FIG. 6, no manual intervention is required when dock leveler 10 is at the position of FIG. 5. Thus, FIGS. 5 and 6 illustrate identifying and distinguishing (i.e., determining) a select intermediate deck position (FIG. 5) within the range of intermediate deck positions and doing so automatically via sensor system 38a. Also, FIGS. 5 and 6 illustrate identifying and distinguishing (i.e., determining) a select intermediate lip position (FIG. 5) within the range of intermediate lip positions and doing so automatically via sensor system 38b.

After servicing vehicle 14, to return dock leveler 10 from its end-loading position of FIG. 6 to its stored, cross-traffic position of FIG. 9, controller 32 commands actuators 24, 26 and 54 to automatically move their respective components through the sequence of positions illustrated in FIGS. 6, 7, 8 and 9. FIG. 7 shows deck 18 rising to an intermediate deck position where lip tip 60 is above lip keeper 62. FIG. 8 shows lip 22 retracting to its retracted lip position, and FIG. 9 shows deck 18 having descended to its cross-traffic position with lip 22 resting upon lip keeper 62. To release vehicle 14, hook 56 descends to its stored position of FIG. 9.

To move dock leveler 10 from its stored, cross-traffic position of FIG. 9 to the end-loading position of FIG. 6, controller 32 commands actuators 24, 26 and 54 to automatically reverse the order of steps illustrated in FIGS. 6, 7, 8 and 9.

In other examples, such automated dock leveler 10 operations may be a part of a more comprehensive automated loading/unloading operation. For example, a determination by controller 32 (based on inputs or signals provided by the deck and lip sensors 38a and 38b) that the leveler 10 is at the loading position of FIG. 4, could cause it to output a signal to an AGV (automatic guided vehicle) or an automated forktruck to authorize loading/unloading to begin. While the position indication capabilities for the leveler deck 18 and lip 22 may allow for the automation referred to above, such automation is not required. For example, illumination of light 70 was provided by controller 32 to signal a safe loading condition. Other signaling based on the position (e.g., the sensed position) of the deck 18 and/or lip 22 could also be provided. Furthermore, sensing of deck 18 and lip 22 positions could be operatively coupled to the operation of other equipment to enforce operational protocols. If for example, a building owner does not want a trailer to be service by a forktruck until the vehicle restraint and leveler 10 were in the position for FIG. 4, a gate could be installed in the area immediately behind the leveler. The controller 32, for example, may be used to prevent the gate from opening until controller 32 provides a signal that the leveler 10 and restraint 52 are in the safe loading position of FIG. 4.

At least some of the aforementioned examples include one or more features and/or benefits including, but not limited to, the following:

In some examples, a dock leveler includes a sensor system that not only identifies uppermost and lowermost deck positions but also identifies at least one intermediate deck position therebetween.

In some examples, a dock leveler includes a sensor system that not only identifies fully extended and fully retracted lip positions but also identifies at least one intermediate lip position therebetween.

In some examples, a dock leveler senses a deck's change in position over time and can thus determine the deck's velocity and acceleration.

In some examples, a dock leveler senses a lip's change in position over time and can thus determine the lip's velocity and acceleration.

In some examples, a controller can be used to automate certain dock leveler movements by sensing a plurality of intermediate deck and/or lip positions.

Although certain example methods, apparatus, and articles of manufacture have been described herein, the scope of the coverage of this patent is not limited thereto. On the contrary, this patent covers all methods, apparatus, and articles of manufacture fairly falling within the scope of the appended claims either literally or under the doctrine of equivalents.

The invention claimed is:

1. A dock leveler being movable in relation to a dock platform and a vehicle bed, the dock leveler comprising:
    a deck having a front edge and a back edge, wherein the front edge relative to the dock platform is movable between an uppermost deck position, a lowermost deck position, and a plurality of intermediate deck positions therebetween;
    a lip coupled to the deck; the lip includes a tip and a rear edge; the rear edge is in proximity with the deck; the lip is movable between an extended lip position, a retracted lip position, and a plurality of intermediate lip positions therebetween, wherein the tip is closer to the back edge of the deck when the lip is in the retracted lip position than when the lip is in the extended lip position;
    a logic circuit; and
    a position sensor operatively coupled to at least one of the deck and the lip, the position sensor providing a signal that varies as a function of at least one of a position of the deck and a position of the lip, such that:
        a) the signal is to enable the logic circuit to distinguish among the plurality of intermediate deck positions when the signal varies as a function of the position of the deck, and
        b) the signal is to enable the logic circuit to distinguish among the plurality of intermediate lip positions when the signal varies as a function of the position of the lip.

2. The dock leveler of claim 1, wherein the position sensor is coupled to the deck, and provides a signal that varies as a function of the position of the deck.

3. The dock leveler of claim 1, wherein the position sensor is coupled to the lip, and the signal varies as a function of the position of the lip.

4. The dock leveler of claim 1, including a first position sensor and a second position sensor, the first position sensor is operatively coupled to the deck to provide a first signal that varies as a function of the position of the deck to enable the logic circuit to distinguish among the plurality of intermediate deck positions, and the second position sensor is operatively coupled to the lip to provide a second signal that varies as a function of the position of the lip to enable the logic circuit to distinguish among the plurality of intermediate lip positions.

5. The dock leveler of claim 4, wherein the logic circuit receives the first and second signals to control the operation of the leveler based on the positions of the deck and lip.

6. The dock leveler of claim 4, wherein the logic circuit receives the first and second signals to control the operation of signaling based on the positions of the deck and lip.

7. The dock leveler of claim 1, wherein the position sensor comprises a retractable/extendable elongate member wrapped around a spool.

8. The dock leveler of claim 1, wherein the logic circuit is to process at least two signals provided by the position sensor to detect at least one of a direction of movement of the deck and a direction of movement of the lip.

9. The dock leveler of claim 1, wherein the logic circuit is to process at least two signals provided by the position sensor to detect a period of time and a distance between the two signals to detect a speed of at least one of the deck as the deck moves between the upper and lower most positions or the lip as the lip moves between the extended and retracted positions.

10. A method of operating a dock leveler installed at a dock platform for serving a vehicle, wherein the dock leveler includes a deck that is movable over a range of intermediate deck positions between an uppermost deck position and a lowermost deck position, the dock leveler also includes a lip coupled to the deck, wherein the lip is movable relative to the deck to an extended lip position, a retracted lip position, and a plurality of intermediate lip positions therebetween, the method comprising:
    continuously detecting deck positions throughout the range of intermediate deck positions to identify at least one select intermediate deck position within the range of intermediate deck positions and doing so automatically via a sensor system.

11. The method of claim 10, further comprising stopping the deck at the select intermediate deck position.

12. The method of claim 10, further comprising identifying and distinguishing among a plurality of select intermediate deck positions within the range of intermediate deck positions.

13. A method of operating a dock leveler installed at a dock platform for serving a vehicle, wherein the dock leveler includes a deck that is vertically movable over a range of intermediate deck positions between an uppermost deck position and a lowermost deck position, the dock leveler also includes a lip coupled to the deck, wherein the lip is movable relative to the deck to an extended lip position, a retracted lip position, and a plurality of intermediate lip positions therebetween, the method comprising:

continuously detecting lip positions throughout the range of intermediate lip positions with a logic circuit to identify at least one select intermediate lip position within the range of intermediate lip positions.

14. The method of claim 13, further comprising stopping the lip at the select intermediate lip position.

15. The method of claim 13, further comprising identifying and distinguishing among a plurality of select intermediate lip positions within the range of intermediate lip positions and doing so automatically via the sensor system.

16. An automated deck leveler comprising:
a deck vertically movable over a range of deck positions between an uppermost deck position and a lowermost deck position;
a lip coupled to the deck, the lip being movable relative to the deck over a range of lip positions between an extended lip position and a retracted lip position;
a logic circuit; and
a deck position sensor coupled to the deck to generate at least one of a deck position-indicative output to the logic circuit for every deck position between the upper and lower travel limits of the deck and a lip position sensor coupled to the lip to generate a lip position-indicative output to the logic circuit for every lip position between the upper and lower travel limits of the lip.

17. A leveler as defined in claim 16, wherein the deck position sensor is to continuously detect the position of the deck between the uppermost and lowermost deck limits.

18. A leveler as defined in claim 16, wherein the lip position sensor is to continuously detect the position of the lip between the extended and retracted lip limits.

19. A leveler as defined in claim 16, wherein the logic circuit receives at least one of the deck position-indicative outputs or the lip position-indicative outputs to detect at least one of a velocity or an acceleration of at least one of, respectively, the deck or the lip.

20. A leveler as defined in claim 19, wherein the logic circuit processes at least one of the deck position-indicative outputs or the lip position-indicative outputs to decelerate respectively at least one of the deck or the lip prior to reaching at least one of a target raised or a lowered position of the respective deck or lip.

21. A leveler as defined in claim 19, wherein the deck begins to descend from a raised position while the lip is moving from a stored position to an extended position.

* * * * *